United States Patent [19]

Fuller

[11] 4,388,139
[45] Jun. 14, 1983

[54] THERMOSENSING ARTICLE AND METHOD OF MANUFACTURE

[76] Inventor: David L. Fuller, 1110 Mountain Creek Trail, NW., Atlanta, Ga. 30328

[21] Appl. No.: 168,014

[22] Filed: Jul. 14, 1980

[51] Int. Cl.³ .............................................. C09J 5/02
[52] U.S. Cl. .................................. 156/307.5; 156/64; 156/277; 156/310; 156/314; 156/330; 264/1.7; 350/351; 374/162; 428/1; 428/913
[58] Field of Search ................... 156/64, 310, 277, 314, 156/307.5, 330; 350/330, 351; 73/356, 901; 150 R; 116/207; 128/736; 264/1.7; 428/1, 913; 23/230 LC; 374/162

[56] References Cited

U.S. PATENT DOCUMENTS

| | | | |
|---|---|---|---|
| 2,222,470 | 11/1940 | Barnes | 73/150 R |
| 3,282,094 | 11/1966 | Hinden | 73/150 R |
| 3,462,337 | 8/1969 | Gorton | 156/330 |
| 3,620,889 | 11/1971 | Baltzer | 428/1 |
| 3,827,301 | 8/1974 | Parker | 73/356 |
| 3,974,317 | 8/1976 | Sharpless | 73/356 |
| 4,180,608 | 12/1979 | Del | 156/330 |

Primary Examiner—John J. Gallagher
Attorney, Agent, or Firm—B. J. Powell

[57] ABSTRACT

A method of fabricating a strip thermometer comprising the steps of applying a plurality of cholesteric liquid crystal compositions exhibiting color changes over different temperature responsive ranges to a first substrate; coating a second substrate with an uncured solid film forming epoxy resin composition; partially curing the epoxy resin composition coating on the second substrate to a non-absorbing partially cured state in which the cholesteric liquid crystal compositions will not be absorbed by the epoxy resin composition; placing the first and second substrates together so that the partially cured epoxy resin composition overlies the cholesteric liquid crystal compositions; forcing the first and second substrates toward each other to cause the partially cured epoxy resin composition to flow around the cholesteric liquid crystal compositions and into contact with the first substrate; and subsequently, finishing the curing of the epoxy resin composition to bond the epoxy resin composition to the first substrate. The thermometer produced by this method is also disclosed.

6 Claims, 7 Drawing Figures

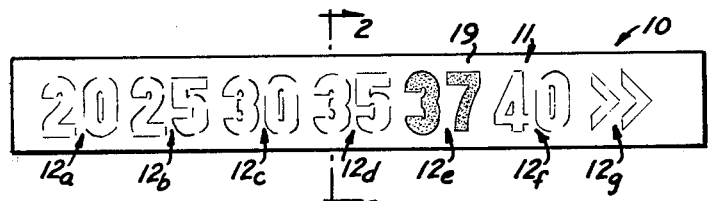
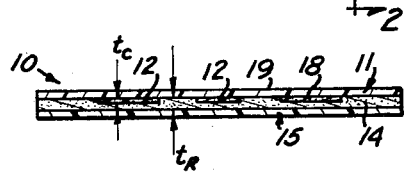
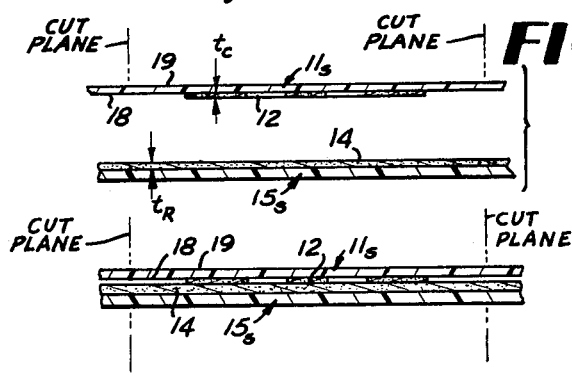
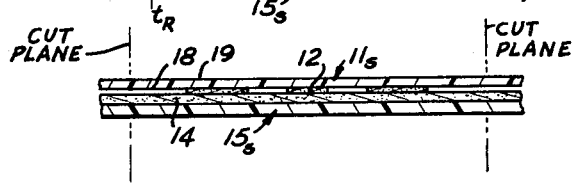
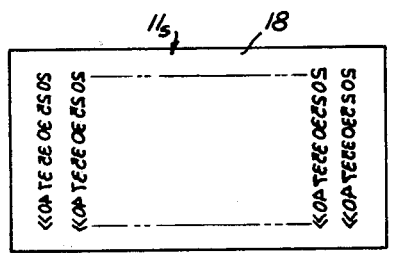
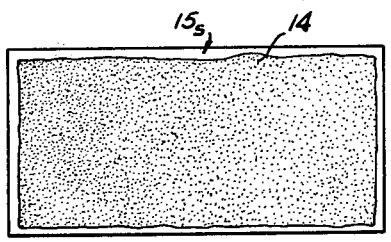
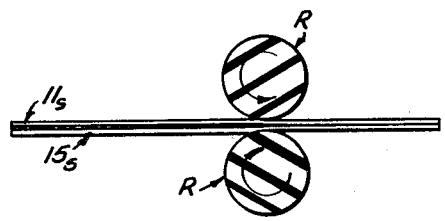

THERMOSENSING ARTICLE AND METHOD OF MANUFACTURE

BACKGROUND OF THE INVENTION

Thermosensing articles using cholesteric liquid crystal compositions which exhibit color changes to indicate temperature have become widely used. One of the primary problems associated with the use of these cholesteric liquid crystal compositions in thermosensing devices is associated with enclosing the compositions to prevent degradation of the compositions by contact with the environment in which the thermosensing article is required to operate while at the same time leaving the composition visually exposed and thermally exposed to the environment. Various fabrication techniques have been used for forming these thermosensing articles; however, such techniques have been hampered by the limited selection of materials available to enclose the liquid crystal compositions and/or the limited ability of the materials used to withstand the environment to which the materials enclosing the liquid crystal compositions are exposed. As a result, such prior art fabrication techniques have been difficult and expensive to carry out.

SUMMARY OF THE INVENTION

These and other problems associated with the prior art are overcome by the invention disclosed herein by providing a thermosensing article and method of manufacture which uses an epoxy resin composition to enclose the liquid crystal composition against a substrate while keeping the liquid crystal in usable condition. The method of the invention comprises the steps of applying the cholesteric liquid crystal composition to a first substrate; applying an epoxy resin composition to a second substrate, partially curing the epoxy resin composition to reduce its absorption capability of the liquid crystal composition, then placing the substrates together so that the partially cured epoxy resin composition overlies the cholesteric compositions, pressing the substrates together to cause the partially cured epoxy resin composition to flow around the cholesteric liquid crystal compositions and into contact with the first substrate to confine the liquid crystal composition between the epoxy resin composition and the first substrate, and subsequently finishing the curing of the epoxy resin composition.

Heretofore, attempts to enclose cholesteric liquid crystal compositions with epoxy resin compositions have not met with success. This is because the uncured epoxy resin composition absorbed the cholesteric liquid crystal composition when applied thereto so that the resulting product was unusable.

It has surprisingly been found that, while the uncured epoxy resin composition absorbs a cholesteric liquid crystal composition in its uncured state, its ability to absorb the cholesteric liquid crystal composition decreases as the epoxy resin composition cures. It has further been found that the epoxy resin composition reaches a partially cured state at which absorption of the cholesteric liquid crystal composition is virtually eliminated while still having the ability to bond to a substrate. It has been found that this non-absorbing partially cured state can be determined by measuring the viscosity of the epoxy resin composition.

In fabricating a thermosensing article according to the invention, the epoxy resin component and hardener component of the epoxy resin composition are mixed as is typical in using such material. The mixed uncured epoxy resin composition is then applied in a thin layer to a supporting substrate while still sufficiently viscous to be easily flowed onto the substrate. Curing of this layer of epoxy resin composition is then allowed to continue until it reaches a non-absorbing partially cured state at which the cholesteric liquid crystal composition will not be absorbed in the epoxy resin composition. After the epoxy resin composition has reached its non-absorbing partially cured state, but before it reaches a sufficient degree of cure to prevent it from bonding, it is placed so that it overlies the liquid crystal compositions which have been previously applied to another substrate. The substrates are then pressed toward each other to cause the epoxy resin composition to flow around the cholesteric liquid crystal compositions and into contact with the substrate carrying the cholesteric liquid crystal compositions. As the epoxy resin composition continues to cure, it bonds to the substrate carrying the liquid crystal compositions so that the liquid crystal compositions are entrapped between the substrate and the epoxy resin composition. When the epoxy liquid crystal composition finishes curing, the fabrication of the thermosensing article is complete.

The thermosensing article of the invention includes a substrate, a layer of cholesteric liquid crystal composition on the substrate, and a layer of cured epoxy resin composition extending around the layer of cholesteric liquid crystal composition and bonded to the substrate to confine the layer of cholesteric liquid crystal composition between the substrate and the cured epoxy resin composition where the epoxy resin composition has been applied over the cholesteric liquid crystal composition after the epoxy resin composition has reached a partially cured state at which the liquid crystal composition will not be absorbed by the epoxy resin composition.

These and other features and advantages of the invention will become more fully understood upon consideration of the following description and accompanying drawings wherein like characters of reference designate corresponding parts throughout the several views and in which:

BRIEF DESCRIPTION OF THE DRAWINGS

FIG. 1 is a front view of a thermometer embodying the invention;

FIG. 2 is an enlarged cross-sectional view taken along line 2—2 in FIG. 1;

FIG. 3 is a face view of a substrate sheet carrying the cholesteric liquid crystal compositions during assembly;

FIG. 4 is a face view of a substrate sheet carrying the epoxy resin composition during assembly;

FIG. 5 is an enlarged fragmentary cross-sectional view of the substrate sheets of FIGS. 3 and 4 while separated;

FIG. 6 is a view similar to FIG. 5 of the substrate sheets during assembly; and

FIG. 7 is a schematic view showing the assembly of the invention.

These figures and the following detailed description disclose specific embodiments of the invention; however, it is to be understood that the inventive concept is not limited thereto since it can be incorporated in other forms.

DETAILED DESCRIPTION OF ILLUSTRATIVE EMBODIMENTS

This invention is directed to nonbreakable digital thermometers which employ several different cholesteric liquid crystal compositions arranged in numerical configurations on a substrate where the value of the numerical configuration is related to the temperature response range of the particular cholesteric liquid crystal composition forming such configuration. The cholesteric liquid crystal compositions are confined between the substrate and a cured epoxy resin composition to keep the liquid crystal compositions in the desired configurations and to protect the liquid crystal composition from the environment in which the thermometer is to be used. A second substrate may be attached to the cured epoxy resin composition on that side opposite the liquid crystal compositions as will become more apparent.

The cholesteric liquid crystal compositions used in the thermometer are well known. Such compositions are usually mixtures of cholesterol derivatives which exhibit color changes in response to temperature changes over a prescribed range as they change from a crystalline phase through a mesophase to a liquid phase, By selecting the particular cholesterol derivatives and the amount of each used in the mixture to form the composition, the transition temperature at which the color change takes place can be appropriately selected. Reference may be had to U.S. Pat. No. 3,619,254 and British Pat. No. 1,041,490 for examples of materials which may be used in such cholesteric liquid crystal compositions.

Referring to FIGS. 1 and 2 of the drawings, it will be seen that the strip thermometer 10 embodying the invention includes a front substrate 11, cholesteric liquid crystal compositions 12 on the substrate 11 in the form of separate numerals and symbols, a cured epoxy resin composition 14 confining the cholesteric liquid crystal compositions between it and the front substrate, and a back substrate 15 behind the cured epoxy resin composition 14. The cured epoxy resin composition 14 is bonded to the front substrate 11 around the cholesteric liquid crystal compositions and to the back substrate 15 to maintain the integrity of the thermometer 10.

In some applications, the thermometer 10 is designed so that the liquid crystal compositions 12 are viewed through the front substrate 11. This is the embodiment illustrated in the drawings. In other applications, the liquid crystal compositions 12 need to be viewed through the back substrate 15 and the epoxy resin composition 14. To enhance the visibility of the liquid crystal compositions 12, the material on that side of the liquid crystal compositions 12 opposite the side being viewed needs to be optically absorptive. As will be understood by those skilled in the art, the basic constructional difference in the two mentioned embodiments resides in the location of the black optically absorptive material which serves to collect and thereby prevent unwanted light from reaching the observer's eyes, thereby enhancing the visibility of the cholesteric liquid crystal compositions. When the liquid crystal compositions 12 are viewed through the front substrate 11 as shown in the drawings, the front substrate 11 is transparent while the epoxy resin composition 14 or the back substrate 15 is rendered optically absorptive. This embodiment of the thermometer 10 is described hereinafter with the black optically absorptive material being an integral part of the epoxy resin composition 14.

On the other hand, when the liquid crystal compositions 12 are viewed through the back substrate 15, both the back substrate 15 and the epoxy resin composition 14 are transparent while the front substrate 11 is rendered optically absorptive. The front substrate 11 may be rendered optically absorptive by coating either side thereof with a black optically absorptive paint or ink, or by incorporating a black optically absorptive dye or pigment integrally in the front substrate 11.

That embodiment of the thermometer 10 to be viewed through the front substrate 11 will be described in detail. It is within the understanding of those skilled in the art to modify this embodiment to permit viewing through the back substrate 15 as described above.

The front substrate 11 is transparent so that the cholesteric liquid crystal compositions 12 are visible therethrough as seen in FIG. 1 in order for a person to view the color changes thereof. The substrate 11 is selected so that the material of the substrate does not detrimentally affect the cholesteric liquid crystal compositions 12. The front substrate 11 is also selected so that the epoxy resin composition 14 will adhere thereto as it cures as will become more apparent. The substrate 11 may be rigid or flexible as desired. Typically, ethylene polyterephthalate (mylar) is used for the front substrate 11 in thicknesses of 0.001–0.02 inch so that it is flexible.

The back substrate 15 is primarily used to support the epoxy resin composition 14 while it is partially cured as will become more apparent. If the back substrate 15 is to form an integral part of the finished thermometer 10, then the material of substrate 15 is selected so that the cured epoxy resin composition 14 is bonded thereto. On the other hand, it may be desirable to remove substrate 15 from the completed thermometer and the material of substrate 15 would be selected so that the epoxy resin composition 14 will not bond thereto or substrate 15 can be overcoated with an appropriate release agent before the epoxy resin composition is applied thereto. Typically, the substrate 15 forms an integral part of the completed thermometer and is made of the same material as the front substrate 11.

The cholesteric liquid crystal compositions 12 are located on the back side 18 of the front substrate 11 so that the compositions are visible from the front side 19 of the substrate 11. Each different composition 12 is arranged in the form of numerals representing the temperature range of color change of that particular composition. For sake of clarity, the different compositions have been referenced $12_a$–$12_g$ respectively. Thus, it will be seen that composition $12_a$ has a range of color change of about 20° C., that a composition $12_b$ has a temperature range of color change of about 25° C., et seq. Each composition 12 has a thickness $t_c$ of about 5–15 microns.

The cured epoxy resin composition 14 serves to bond the thermometer 10 together as well as confine the cholesteric liquid crystal compositions 12. The composition 14 is sufficiently thick so that it extends around all sides of the cholesteric liquid crystal compositions 12 except that side in contact with the back surface 18 of the front substrate 11. The epoxy resin composition 14 has a thickness $t_R$ between the cholesteric liquid crystal compositions 12 of about 25–80 microns as seen in FIG. 2. In this embodiment, the composition 14 is black and optically absorptive to enhance the visibility of the cholesteric liquid crystal compositions 12 through the front substrate 11 and has about the same flexibility as the front substrate 11.

The cured epoxy resin composition 14 is derived from a two-component epoxy system with an epoxy resin component and a hardener component. These components are kept separate until the composition 14 is to be formed. At that time, the epoxy resin component and hardener component are mixed and this mixture then cures from a liquid state to a solid state to form a durable, flexible solid. When the epoxy resin composition needs to be optically absorptive to enhance the visibility of the cholesteric liquid crystal compositions, a coloring agent such as carbon black can be mixed with the components of the composition 14 either before the components are mixed or during the mixing of the components.

When the epoxy resin composition is first mixed and is in its uncured state, it rapidly absorbs the liquid crystal compositions if it comes in contact with them. In addition, there is a chemical reaction between the uncured epoxy resin composition and the liquid crystal compositions which artificially lowers the temperature range of color change of the liquid crystal compositions substantially. Thus, the uncured epoxy resin composition cannot be used to overcoat the liquid crystal compositions directly.

Surprisingly, it has been found that, as the epoxy resin composition cures, it reaches a partially cured state after which it will not absorb the liquid crystal compositions. It has also been found that the detrimental chemical effect on the liquid crystal compositions experienced with the uncured epoxy resin composition is significantly reduced in the non-absorbing partially cured state. Thus, once this non-absorbing partially cured state is reached, the epoxy resin composition can be placed in contact with the liquid crystal compositions at any time thereafter without the liquid crystal compositions being absorbed by the epoxy resin composition. Because the degree of cure of the epoxy resin composition can be related to its viscosity, the epoxy resin composition can be empirically tested until the partially cured non-absorbing state is reached and the viscosity of the epoxy resin composition when this state is reached noted. Once this is determined, the non-absorbing partially cured state can again be repeated simply by checking the viscosity of the epoxy resin composition until this same viscosity is reached. For purposes of this application, the viscosity of the epoxy resin composition at the time the non-absorbing partially cured state is first reached will be called the initial non-absorbing viscosity.

Because the cholesteric liquid crystal compositions always have sufficient viscosity for them to flow under pressure, the epoxy resin composition must have sufficient flowability for the epoxy resin composition to flow around the cholesteric liquid crystal compositions without significantly causing the cholesteric liquid crystal compositions to flow and become distorted as the epoxy resin composition in its non-absorbing partially cured state is applied over the cholesteric liquid crystal compositions. The flowability of the epoxy resin composition decreases as the composition cures. It will thus be seen that, as the epoxy resin composition cures, it reaches a state of cure after which it does not have the sufficient flowability to allow the epoxy resin composition to flow around the cholesteric liquid crystal compositions without distorting them. The flowability of the epoxy resin composition is, of course, related to its viscosity. Thus, as the epoxy resin composition cures, its viscosity increases. This is evidenced by the poise values increasing. For purposes of this application, the viscosity at which the epoxy resin composition starts to detrimentally distort the liquid crystal compositions as it is applied thereover will be called the minimum flowable viscosity. It has been empirically determined that this minimum flowable viscosity for the epoxy resin composition 14 is about 1000 poise. Thus, the epoxy resin composition can flow around the cholesteric liquid crystal compositions as will be further explained without distorting them as long as the poise value of the viscosity of the epoxy resin composition is less than about 1000 poise.

It follows from the above that the non-absorbing partially cured state determines the minimum degree of cure of the epoxy resin composition at which it can be applied to the cholesteric liquid crystal compositions while its flowability determines the maximum degree of cure of the epoxy resin composition can be applied to the cholesteric liquid crystal compositions. Thus, epoxy resin compositions usable in the invention are limited to those which reach the initial non-absorbing viscosity before the minimum flowability viscosity is reached.

In order for the epoxy resin composition to bond the thermometer 10 together, it must still be able to adhere to the front substrate 11 when it is applied over the cholesteric liquid crystal compositions 12. Preferably, the epoxy resin composition should still adhere to the front substrate 11 at the minimum flowable viscosity in order that that maximum range of application of the epoxy resin composition over the cholesteric liquid crystal compositions can be utilized.

Also, it will be appreciated that the epoxy resin compositions chosen are limited to those which, when placed in contact with the liquid crystal compositions, do not chemically interfere with the operation of the liquid crystal compositions to an appreciable degree so as to render the liquid crystal compositions unusable. Because the epoxy resin composition is not placed in contact with the liquid crystal compositions until the non-absorbing partially cured state is reached, any epoxy resin composition can be used which does not chemically interfere with the liquid crystal compositions in its non-absorbing partially cured state.

It has been found that an epoxy system using a polyamide hardener component can meet the above criteria. An epoxy resin composition produced by this epoxy system reaches a non-absorbing partially cured state with an initial non-absorbing viscosity of about 500 poise which is less than the above mentioned poise value at the minimum flowable viscosity sufficiently for the epoxy resin composition to be applied to the cholesteric liquid crystal compositions before the minimum flowable viscosity is reached.

The cholesteric liquid crystal compositions 12 vary in viscosity as they pass through their various temperature responsive states. They have a minimum viscosity when they are at temperatures below their transition temperatures. Even at this minimum viscosity, however, the cholesteric liquid crystal compositions still have sufficient viscosity to flow under pressure so that the overall shape of the liquid crystal compositions can be distorted as mentioned above. It has been found that the flowability of these cholesteric liquid crystal compositions is also related to their thickness, especially when this thickness is very thin. In other words, a thickness can be reached where it is very difficult to flow the cholesteric liquid crystal composition. On the other hand, this thickness is limited by the fact that the cholesteric liquid crystal composition must be sufficiently thick to be easily perceptible visually so that the color changes in the liquid crystal composition responsive to temperature can be visually noted. It has been emperically found that, by making the cholesteric liquid crystal compositions with a thickness $t_c$ as seen in FIG. 2 of about 5-15 microns, the cholesteric liquid crystal compositions are sufficiently thick to be easily perceived visually to note the color change while at the same time the flowability of the cholesteric liquid crystal compositions is minimized. It will be appreciated that the cholesteric liquid crystal compositions should be maintained below their temperature range of color change while the thermometer 10 is being fabricated as will become more apparent so that the viscosity of each is minimized.

FABRICATION

Typically, the thermometer 10 is fabricated in laminated sheets containing a plurality of thermometers 10 and then the sheets cut apart to form the individual thermometers 10. This is typically done using a front substrate sheet $11_s$ as seen in FIG. 3 from which a plurality of front substrates $11_s$ are to be made. Similarly, a back substrate sheet $15_s$ as seen in FIG. 4 from which a plurality of back substrates $15_s$ are to be made is used.

The different cholesteric liquid crystal compositions 12 for each of the thermometers 10 to be made from the front substrate sheet $11_s$ are silk-screened onto the back side of the front substrate sheet $11_s$ to produce the array as illustrated in FIG. 3. The cholesteric liquid crystal compositions 12 are silk-screened onto the front substrate sheet $11_s$ and have the thickness $t_c$ of about 5-15 microns. The temperature of the cholesteric liquid crystal compositions on the front substrate sheet $11_s$ is maintained below the lowest temperature range of color change of any of the cholesteric liquid crystal compositions on the sheet $11_s$ until after the thermometers have been finally assembled as will become more apparent. For the compositions shown, the temperature would be maintained below about 20° C. It will be appreciated that the cholesteric liquid crystal compositions 12 may be applied to the front substrate sheet $11_s$ any time prior to the placement of the epoxy resin composition thereon as will become more apparent.

The epoxy resin composition is mixed from its components and, while still in an uncured state, applied as a thin layer to one side of the back substrate sheet $15_s$ as illustrated in FIGS. 4 and 5. Typically, this uncured layer of epoxy resin composition is applied to the back substrate sheet $15_s$ by slik-screening, although other coating techniques can be used to apply the epoxy resin composition to the back substrate sheet. The thickness of the layer of uncured epoxy resin composition applied to the back substrate sheet $15_s$ is about 25-80 microns. While supported on the back substrate sheet $15_s$ and separate from the cholesteric liquid crystal compositions applied to the front substrate sheet $11_s$, the epoxy resin composition is allowed to partially cure until the non-absorbing partially cured state is reached. This non-absorbing partially cured state is typically determined by checking the viscosity until the initial non-absorbing viscosity is reached. Typically, the epoxy resin composition is maintained at about the same temperature as the cholesteric liquid crystal compositions during this curing step so that it will be at the same temperature as the cholesteric liquid crystal compositions when applied thereto as described below.

When the layer of epoxy resin composition on the back substrate sheet $15_s$ has reached the non-absorbing partially cured state and while it is about the same temperature as the cholesteric liquid crystal compositions, the front substrate sheet $11_s$ and the back substrate sheet $15_s$ are placed in juxtaposition with each other so that the back surfaces of the cholesteric liquid crystal compositions 12 opposite the sheet $11_s$ lie against the front surface of the layer of epoxy resin composition 14 opposite the sheet $15_s$ as seen in FIG. 6. This is done before the epoxy resin composition has reached the minimum flowable viscosity.

Still before the epoxy resin composition has reached the minimum flowable viscosity and while it will adhere to the front substrate sheet $11_s$, the substrate sheets $11_s$ and $15_s$ are forced toward each other with sufficient force to cause the epoxy resin composition to flow around the cholesteric liquid crystal compositions and into adhering contact with the back surface of the front substrate sheet $11_s$ between the cholesteric liquid crystal compositions 12 without distorting the cholesteric liquid crystal compositions 12. It has been found that a pressure of about 10-40 psi is sufficient for this purpose. At this time, the cross-sectional configuration of the laminate corresponds to that seen in FIG. 2. While a number of different techniques can be used to force the substrate sheets $11_s$ and $15_s$ toward each other, passing the sheets $11_s$ and $15_s$ between calendar rolls R as schematically shown in FIG. 7 works satisfactorily.

After the substrate sheets $11_s$ and $15_s$ have been forced toward each other to form the laminate, the epoxy resin composition is fully cured. This serves to permanently bond the sheets $11_s$ and $15_s$ together, whereupon the laminate is cut into strips to form the thermometers 10. Any number of techniques may be used to cut the laminate into the thermometers 10.

If the back substrate 15 is not to be left on the thermometer 10, it may be removed either before of after the laminate is cut to form the thermometers 10. The substrate 15 would be left in place at least until after the substrate sheets $11_s$ and $15_s$ are pressed together to prevent the partially cured epoxy resin composition from sticking to the device forming the epoxy resin composition around the cholesteric liquid crystal compositions.

By way of example, an epoxy resin composition with a polyamide hardener component was selected which had an initial non-absorbing viscosity at its non-absorbing, partially cured state of about 500 poise and a minimum flowable viscosity of about 1000 poise. After the components were mixed with enough carbon black to give the composition a black color, the uncured composition was silk-screened onto a mylar substrate sheet one mil thick to form a layer about forty microns thick. The layer of epoxy resin composition was cured at a temperature of about 15° C. until the composition had a viscosity of about 750 poise. In the meantime, a series of cholesteric liquid crystal compositions were silk-screened onto another one mil thick mylar substrate sheet at a thickness of about eight microns where the lowest temperature range of color change of the compositions was about 20° C. The cholesteric liquid crystal compositions were also maintained at about 15° C. The substrate sheets were placed in juxtaposition with each other so that the cholesteric liquid crystal compositions lay against the epoxy resin composition. Immediately thereafter, the substrate sheets were passed between calendar rolls which forced the sheets toward each other with a pressure of about 25 psi to form a laminate. After the laminate was formed, the epoxy resin composition was allowed to fully cure. Thereafter, the sheets were cut into strips to form thermometers therefrom. The resulting thermometers performed satisfactorily.

What is claimed as invention is:

1. A method of fabricating a strip thermometer comprising the steps of:

applying to a first substrate a plurality of cholesteric liquid crystal compositions exhibiting color changes with different temperature responsive ranges that each such composition so applied is spaced from the other such compositions so applied and where the liquid crystal compositions are sufficiently viscous to flow under pressure;

coating a second substrate with an uncured solid film forming epoxy resin composition, which absorbs the liquid crystal compositions while in the uncured state;

partially curing the epoxy resin composition coating on the second substrate while maintaining the epoxy resin coating separated from the cholesteric liquid crystal compositions until the epoxy resin composition reaches a non-absorbing partially cured state in which the cholesteric liquid crystal compositions will not be absorbed by the epoxy resin composition;

placing the first and second substrates together so that the partially cured epoxy resin composition overlies all of the cholesteric liquid crystal compositions on the first substrate while the epoxy resin composition is in the non-absorbing partially cured state;

with the partially cured epoxy resin composition overlying the cholesteric liquid crystal compositions, forcing the first and second substrates toward each other while the epoxy resin composition has sufficient fluidity to flow around the cholesteric liquid crystal compositions without substantially distorting the cholesteric liquid crystal compositions to cause the partially cured epoxy resin composition to flow around the cholesteric liquid crystal compositions and into contact with the first substrate between the cholesteric liquid crystal compositions so that the epoxy resin composition adheres to the first substrate and confines the cholesteric liquid crystal compositions between the epoxy resin composition and the first substrate; and subsequently, finishing the curing of the epoxy resin compound to bond the epoxy resin composition to the first substrate.

2. The method of claim 1 further including the step of maintaining the temperature of the cholesteric liquid crystal compositions below the lowest temperature range of color change of any of the cholesteric liquid crystal compositions until after the step of forcing the substrates together to assist in preventing distortion of the cholesteric liquid crystal compositions as the epoxy resin composition flows around the cholesteric liquid crystal compositions.

3. The method of claim 1 wherein the thickness of the cholesteric liquid crystal compositions on the first substrate is 5–15 microns and wherein the thickness of the epoxy resin composition on the second substrate is at least three times the thickness of the cholesteric liquid crystal compositions.

4. The method of claim 3 wherein the epoxy resin composition is selected to have an initial non-absorbing viscosity when the epoxy resin composition reaches the non-absorbing partially cured state lower than the minimum flowable viscosity at which the epoxy resin composition can flow around the cholesteric liquid crystal compositions without distorting the cholesteric liquid crystal compositions.

5. The method of claim 4 where the minimum flowable viscosity is about 1,000 poise, wherein the epoxy resin composition is selected to have an initial non-absorbing viscosity of about 500 poise, and wherein the step of forcing the substrates toward each other is performed after the epoxy resin composition reaches the initial non-absorbing viscosity of about 500 poise and before the epoxy resin composition reaches the minimum flowable viscosity of about 1,000 poise.

6. The method of claim 5 wherein the thickness of the epoxy resin composition coating on the second substrate is about 25–80 microns.

* * * * *